United States Patent
Hake et al.

(10) Patent No.: US 8,746,361 B2
(45) Date of Patent: Jun. 10, 2014

(54) TILLAGE IMPLEMENT WITH ADJUSTABLE GANG ANGLE

(71) Applicant: Great Plains Manufacturing, Inc., Salina, KS (US)

(72) Inventors: Rodney D. Hake, Tipton, KS (US); Michael J. Ohnsat, Tipton, KS (US); Hank A. Kummer, Lindsborg, KS (US)

(73) Assignee: Great Plains Manufacturing, Inc., Salina, KS (US)

( * ) Notice: Subject to any disclaimer, the term of this patent is extended or adjusted under 35 U.S.C. 154(b) by 0 days.

(21) Appl. No.: 13/964,806

(22) Filed: Aug. 12, 2013

(65) Prior Publication Data

US 2013/0327550 A1     Dec. 12, 2013

Related U.S. Application Data

(63) Continuation of application No. 13/219,282, filed on Aug. 26, 2011, now Pat. No. 8,534,374.

(51) Int. Cl.
| | |
|---|---|
| *A01B 5/00* | (2006.01) |
| *A01B 7/00* | (2006.01) |
| *A01B 21/00* | (2006.01) |
| *A01B 35/16* | (2006.01) |
| *A01B 35/28* | (2006.01) |
| *A01B 39/08* | (2006.01) |

(52) U.S. Cl.
USPC ......................................................... 172/581

(58) Field of Classification Search
USPC ......... 172/581, 456, 569, 599, 600, 601, 603, 172/776, 586; 111/59, 60.66, 69, 900
See application file for complete search history.

(56) References Cited

U.S. PATENT DOCUMENTS

| | | | | |
|---|---|---|---|---|
| 633,465 | A | * | 9/1899 | Mertes .......................... 172/349 |
| 1,472,515 | A | | 10/1923 | Dickinson |
| 2,046,851 | A | | 7/1936 | Rutter |
| 2,285,550 | A | * | 6/1942 | Woods .......................... 172/320 |
| 2,600,854 | A | * | 6/1952 | Cross ............................ 172/576 |
| 2,667,724 | A | | 2/1954 | Johnson et al. |
| 2,682,738 | A | * | 7/1954 | Ochler et al. ................. 172/589 |

(Continued)

OTHER PUBLICATIONS

Excelerator Vertical Tillage Product Marketing Bulletin; Form # PMB 8000-100; Dec. 2010; 16 pages; Krause Corporation, 305 S. Monroe, PO Box 2707, Hutchinson, KS 67504-2707.

(Continued)

*Primary Examiner* — Árpád Fábián-Kovács
(74) *Attorney, Agent, or Firm* — Hovey Williams LLP

(57) ABSTRACT

A tillage implement has gang assemblies of rotatable tillage tools that can be angle-adjusted from the seat of the towing tractor using hydraulic actuators. The tillage tools may comprise generally flat, wavy coulter blades or the like so that the machine may be set up for vertical tillage with the coulters aligned at a zero degree angle with the path of travel of the implement or for residue management operations with the coulters maintained at an oblique angle of up to ten degrees relative to the path of travel. A six degree angle is preferred for the residue management position. A master-slave hydraulic flow arrangement for the actuators assures simultaneous actuation, while mechanical synchronizing apparatus between the two front gang assemblies on the center frame section of the machine assures synchronized movement of those assemblies. Mechanical motion-transmitting mechanism transmits the hydraulically powered adjusting movement of the front gang assemblies to the rear gang assemblies.

7 Claims, 17 Drawing Sheets

(56) References Cited

U.S. PATENT DOCUMENTS

| | | | |
|---|---|---|---|
| 2,684,563 A * | 7/1954 | Gunyou | 172/588 |
| 2,704,017 A | 3/1955 | Wilson | |
| 2,905,255 A * | 9/1959 | Kampe | 172/441 |
| 2,943,691 A * | 7/1960 | Kramer | 172/572 |
| 2,952,325 A | 9/1960 | Toland | |
| 3,080,933 A | 3/1963 | Kramer et al. | |
| 3,191,691 A | 6/1965 | Newkirk | |
| 3,223,178 A | 12/1965 | Clifford et al. | |
| 3,292,714 A | 12/1966 | Tsuchiya et al. | |
| 3,648,780 A | 3/1972 | Fueslein et al. | |
| 3,759,332 A | 9/1973 | Robertson, Sr. | |
| 4,180,135 A | 12/1979 | Birkenbach et al. | |
| 4,423,789 A | 1/1984 | Anderson et al. | |
| 4,450,915 A | 5/1984 | DeHaai | |
| 4,492,272 A | 1/1985 | Jensen | |
| 4,591,003 A | 5/1986 | Broome et al. | |
| 5,462,123 A | 10/1995 | Harlan et al. | |
| 5,628,373 A | 5/1997 | Domries | |
| 5,649,602 A | 7/1997 | Bruce | |
| 5,878,821 A | 3/1999 | Flenker et al. | |
| 5,915,481 A * | 6/1999 | Flenker et al. | 172/166 |
| 6,530,332 B2 | 3/2003 | Burley | |
| 6,557,646 B1 | 5/2003 | Hurtis et al. | |
| 6,612,381 B2 | 9/2003 | Powell et al. | |
| 7,000,708 B2 | 2/2006 | Powell et al. | |
| 7,108,075 B2 | 9/2006 | Powell et al. | |
| 7,478,683 B2 | 1/2009 | Peck et al. | |
| 2006/0124327 A1 | 6/2006 | Powell et al. | |
| 2011/0056712 A1* | 3/2011 | Rozendaal et al. | 172/1 |
| 2012/0312569 A1* | 12/2012 | Redekop | 172/311 |

OTHER PUBLICATIONS

28 Foot Vertical Tillage Machine with a Twist; YouTube Screen Captures taken Dec. 6, 2012 from the following web address: http://www.youtube.com/watch?v=IrRxC0XXeDs$feature=related; Video uploaded Jun. 15, 2010; pp. 1-12.

\* cited by examiner

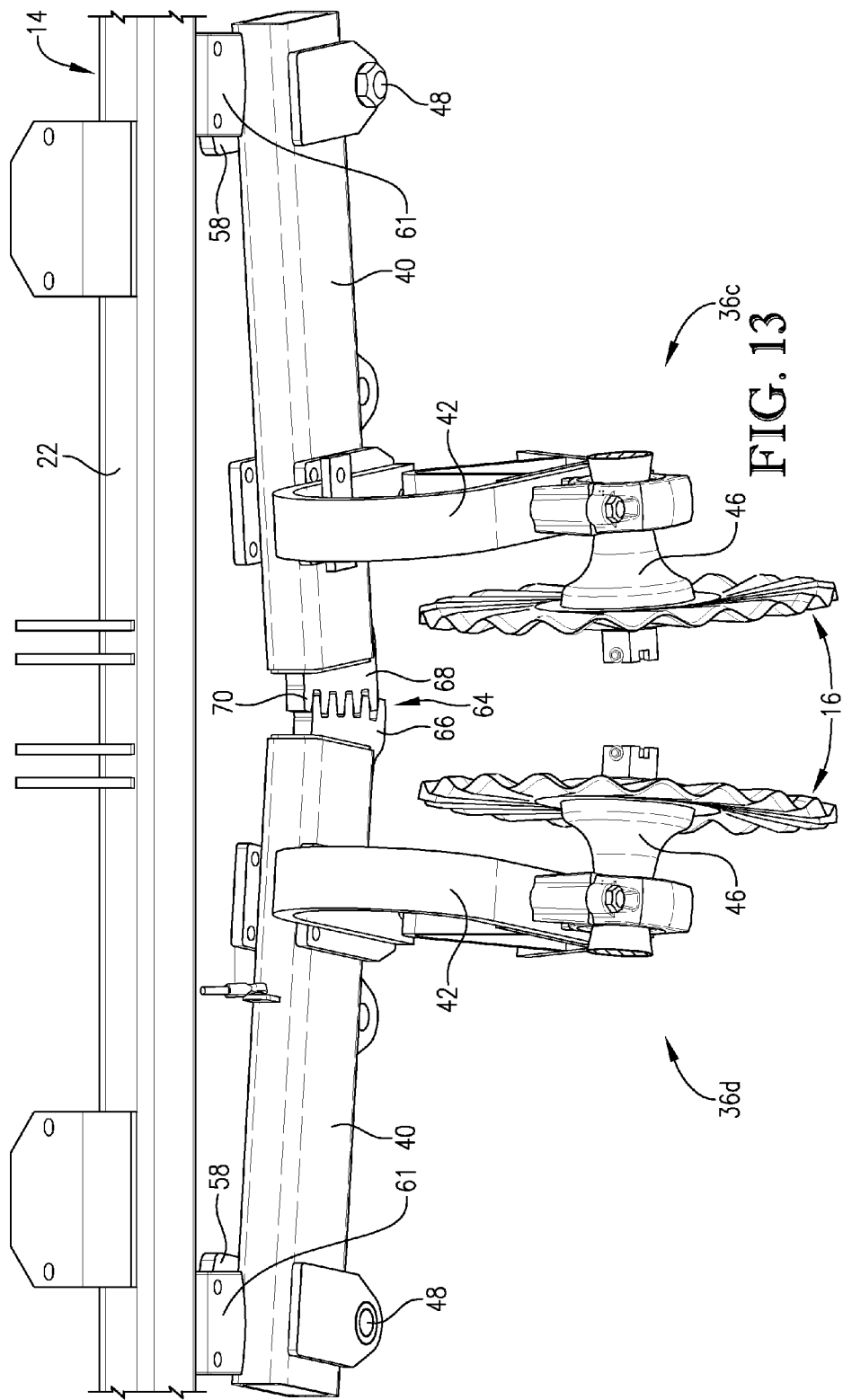

TILLAGE IMPLEMENT WITH ADJUSTABLE GANG ANGLE

CROSS-REFERENCE TO RELATED APPLICATION

This is a continuation of copending application Ser. No. 13/219,282, filed Aug. 26, 2011, and titled TILLAGE IMPLEMENT WITH ADJUSTABLE GANG ANGLE, said Application in its entirety being hereby incorporated by reference into the present specification.

TECHNICAL FIELD

The present invention relates to tillage equipment, and, more particularly, to equipment that utilizes gangs of rotating coulters, discs, or other tools to carry out the tilling function of the machine. Some aspects of the invention are particularly directed to machines with generally flat (nonconcavo-convex), blade-like coulters as the tilling tools, while other aspects are more broadly applicable to machines with any type of rotatable tilling tools.

BACKGROUND AND SUMMARY

Machines for carrying out principles of vertical tillage have grown in popularity in recent years. Such vertical tillage machines have typically employed gangs of generally flat coulters, as opposed to concavo-convex discs, that are disposed in straight-ahead, parallel alignment with the path of travel of the machine. The coulters may be provided with lateral projections such as waves or flutes to make them more aggressive as they cut through surface residue and engage, fracture and lift the soil. Generally speaking, it is not their objective to turn over and move significant amounts of soil to the side as they work, in contrast to disc machines wherein the discs are typically disposed at oblique angles to the machine's path of travel, but rather to create relatively narrow strips of tilled soil. Therefore, vertical tillage machines with rotating coulters are commonly used in the spring as pre-plant tools ahead of a planter for cutting plant residue left over from the previous fall harvest and for preparing an excellent seed bed. One such commercially successful vertical tillage machine has been available for several years from Great Plains Manufacturing, Inc., the assignee of the present invention, as the TURBO-TILL series of machines.

Because vertical tillage machines of this type employing rotatable coulters have only a limited ability to lift and move soil laterally to cover and incorporate residue, it has historically been necessary to use a separate more aggressive disc-type machine for fall tillage operations or other situations where significant soil displacement is desired. Yet, conventional disc-type machines are often not suitable for light spring operations, particularly ahead of no-till or minimum till planters. Thus, in the past, it has been necessary to have two separate machines to meet these two distinctly different needs, i.e., a vertical tillage machine for spring, seed bed preparation work and a disc tillage machine for fall, residue management work.

In one aspect, the present invention provides a highly versatile combination vertical tillage and residue management machine wherein the generally flat coulters may be angularly adjusted between a zero degree vertical tillage position in which the coulters are disposed straight ahead in parallel alignment with the path of travel of the machine and an oblique residue management position in which the coulters are disposed at up to a ten degree angle relative to the machine's path of travel. Preferably, when the gangs are in the residue management position, the coulters are disposed at no more than a six degree angle. Thus, the same vertical tillage machine can be used for either vertical tillage operations or more aggressive residue management operations.

Other aspects of the present invention are not necessarily limited to a combination vertical tillage and residue management machine. In this respect, the present invention provides for remote hydraulic adjustment of the gang angle from the seat of the towing vehicle, whether the tillage tools are rotatable coulters, discs, or other devices. The hydraulic actuators are directly coupled with front gangs, while mechanical linkage transmits the adjusting movement of the front gangs to a set of corresponding rear gangs to carry out simultaneous adjustment of both the front and rear gangs. The machine has left and right gangs on opposite sides of the fore-and-aft center line of the machine. The two left and right center gangs immediately adjacent opposite sides of the fore-and-aft axis each have their own hydraulic actuator but are mechanically interconnected at their proximal inboard ends by synchronizing apparatus that assures synchronized movement of the two separately powered gangs. If the machine is a multiple wing machine with a center frame section and a pair of left and right hinging frame sections on opposite sides of the center section, the hydraulic circuit for actuating the gangs may include a master-slave system for each left and right half of the machine. The master actuator on the center frame section controls successively reduced diameter slaves on the corresponding wing section.

BRIEF DESCRIPTION OF THE DRAWINGS

FIG. 13 is an enlarged, fragmentary, bottom front perspective view illustrating details of the synchronizing gear segments for the center front gang assemblies of the machine;

DETAILED DESCRIPTION

The present invention is susceptible of embodiment in many different forms. While the drawings illustrate, and the specification describes, certain specific embodiments of the invention, it is to be understood that such disclosure is by way of example only. The principles of the present invention are not limited to the particular disclosed embodiments. Directional terms used in the following specification, such as the terms "left" and "right", are given from the viewpoint of one standing at the rear of the machine looking forwardly.

Figure 1:
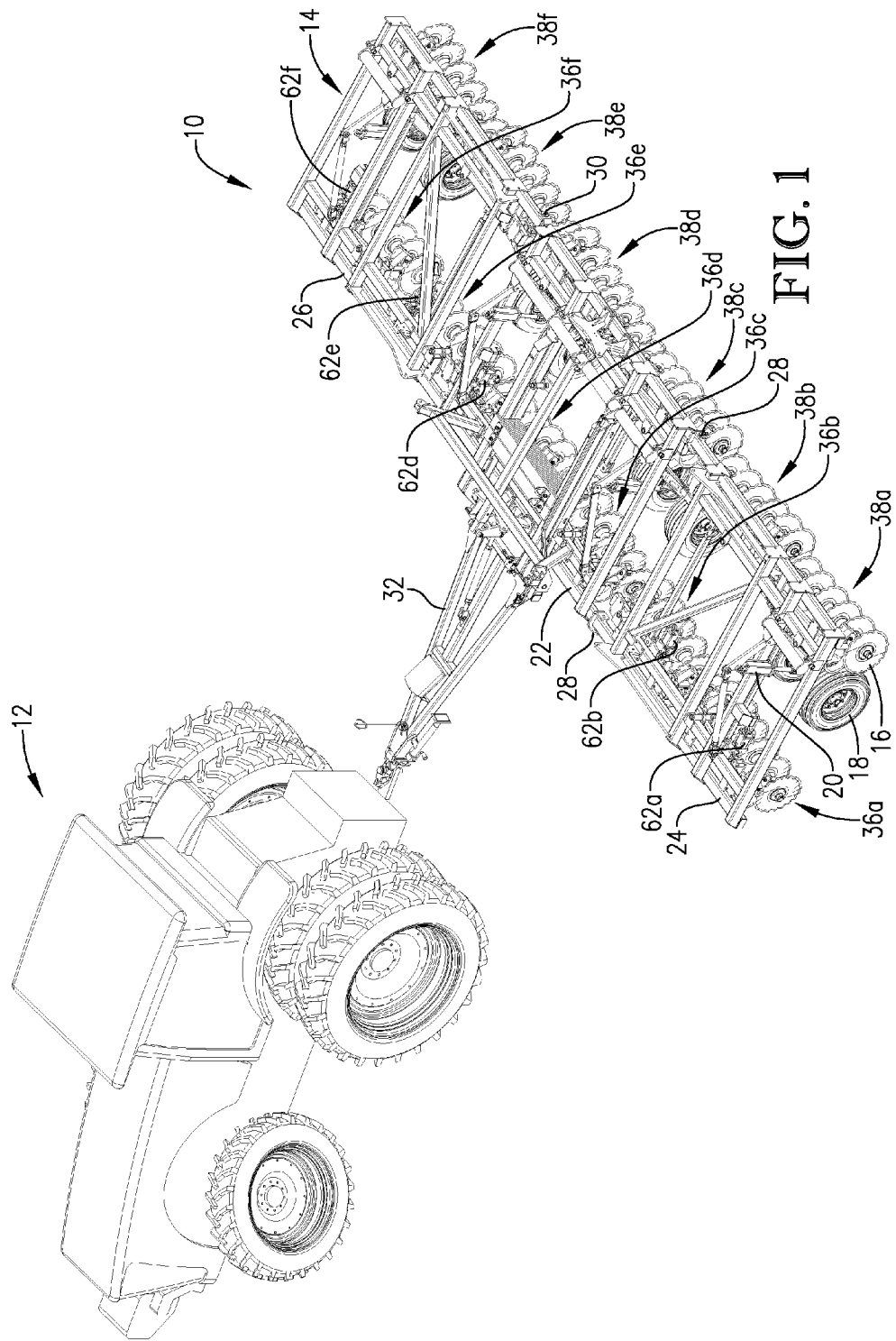
FIG. 1 is a top, left, rear perspective view of a tillage machine constructed in accordance with the principles of the present invention and illustrated as being connected to a towing tractor.
Figure 5:
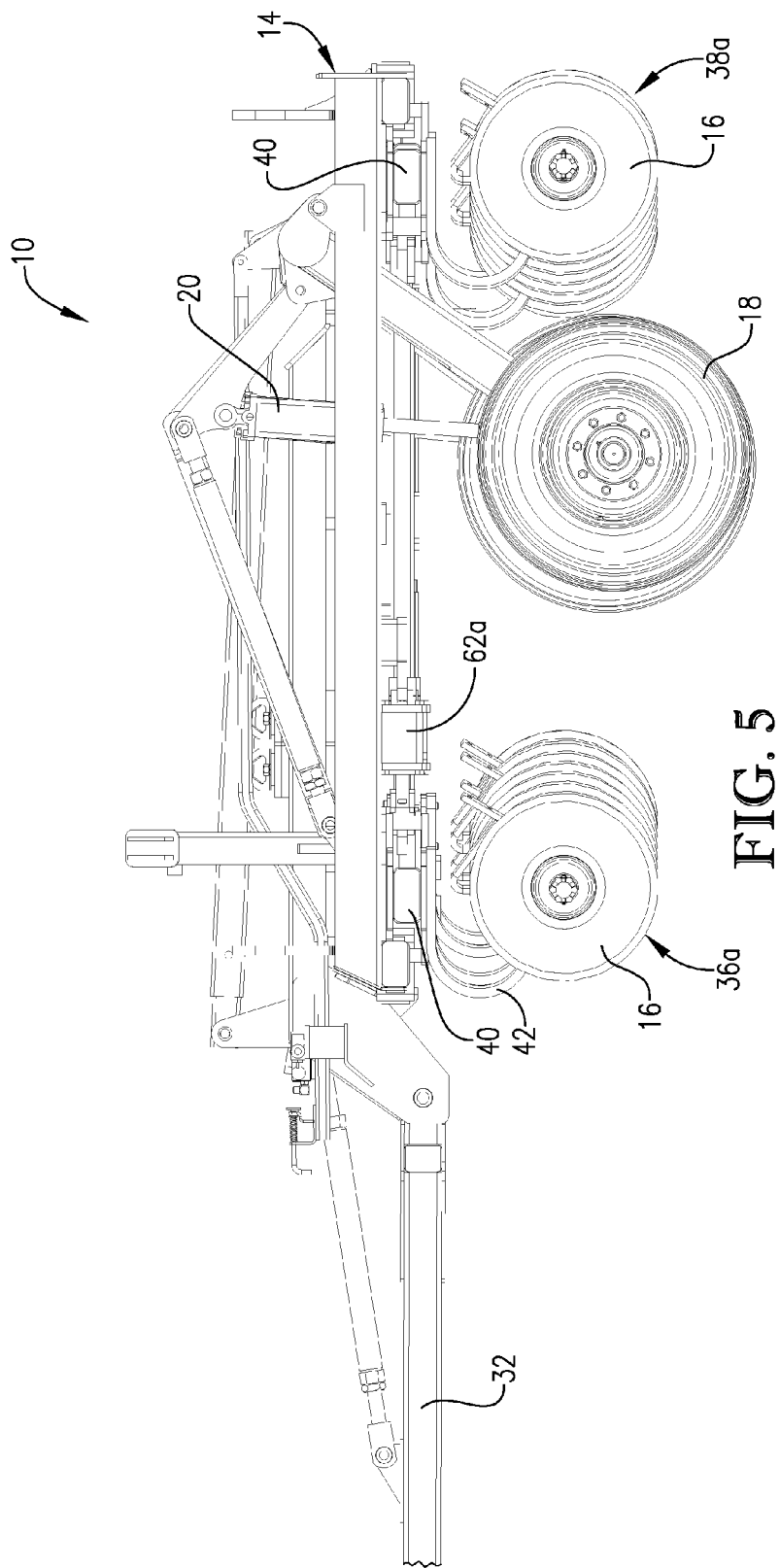
FIG. 5 is an enlarged, fragmentary left side elevational view of the machine in a raised, transport position.
Figure 6:
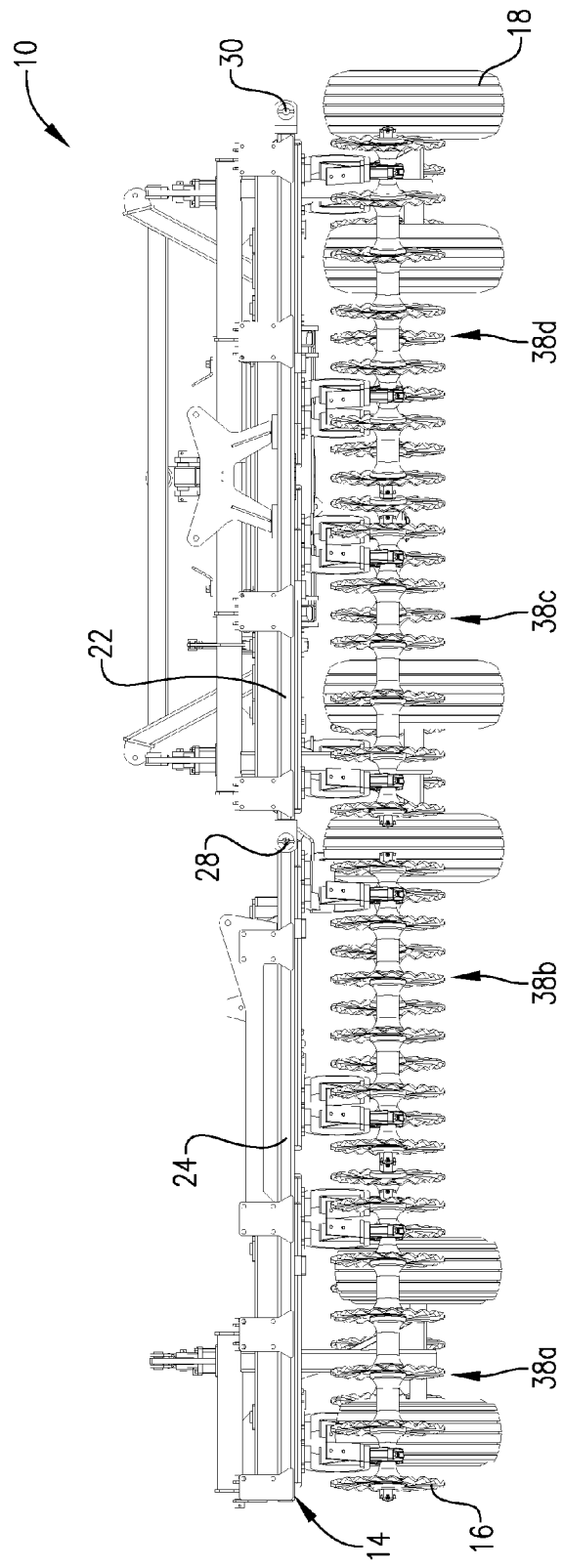
FIG. 6 is an enlarged rear elevational view of the machine in the raised transport position with the right wing section removed.

Referring initially to FIG. 1, a tillage implement 10 incorporating the principles of the present invention is illustrated as being connected to a towing tractor 12 for traversing a field to be tilled. Broadly speaking, implement 10 comprises a mobile frame 14 that carries a number of gangs of ground-engaging, rotatable tillage tools 16. Wheels 18 on frame 14 support the same for movement over the ground and are adjustable up and down relative to frame 14 by hydraulic actuators 20 for thereby controlling the depth of soil penetration of tools 16 or their height above the ground when implement 10 is fully raised to a transport position as illustrated in FIG. 5.

Figure 2:
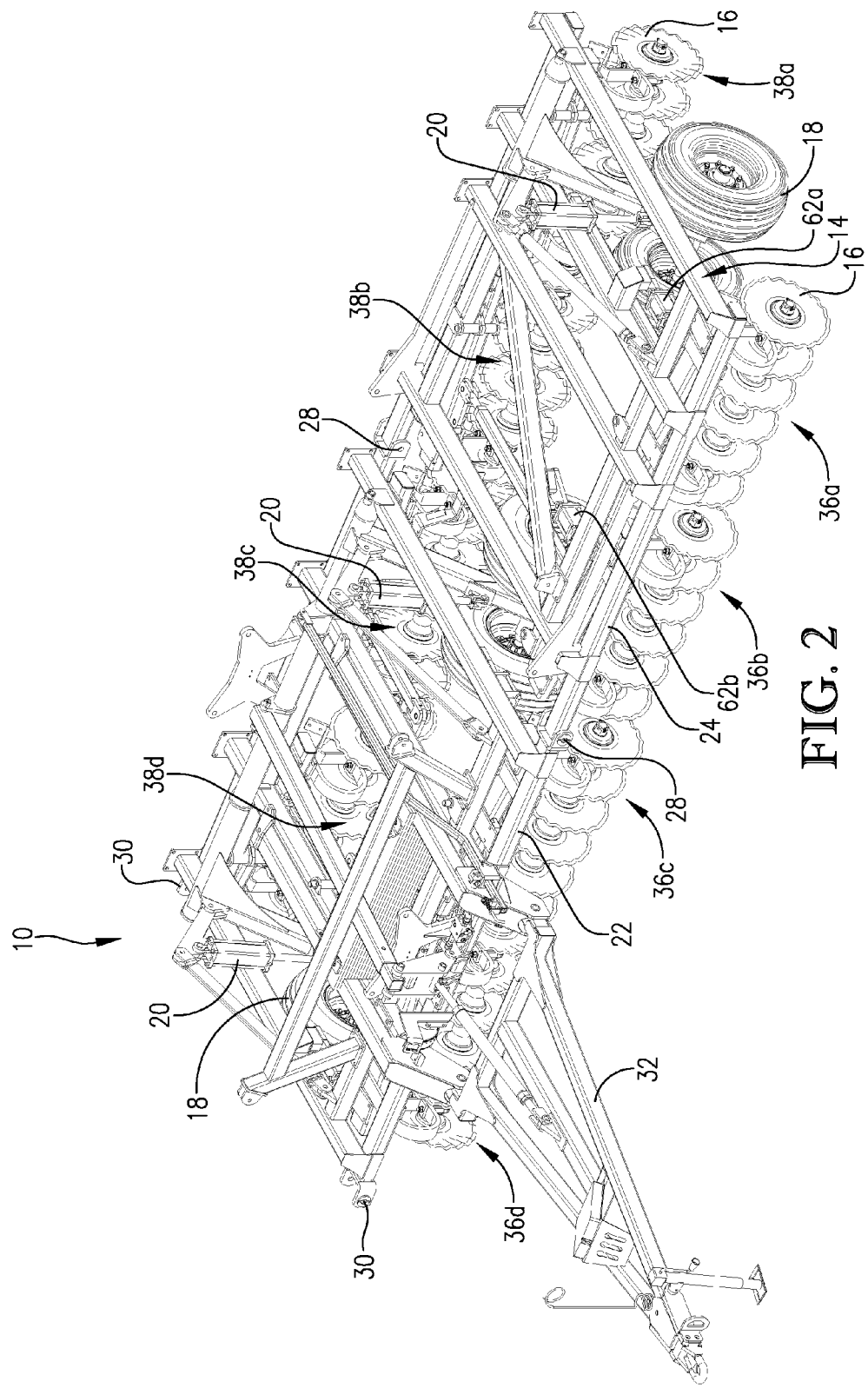
FIG. 2 is an enlarged, left front perspective view of the tillage machine with the right wing section removed for purposes of scale.
Figure 3:
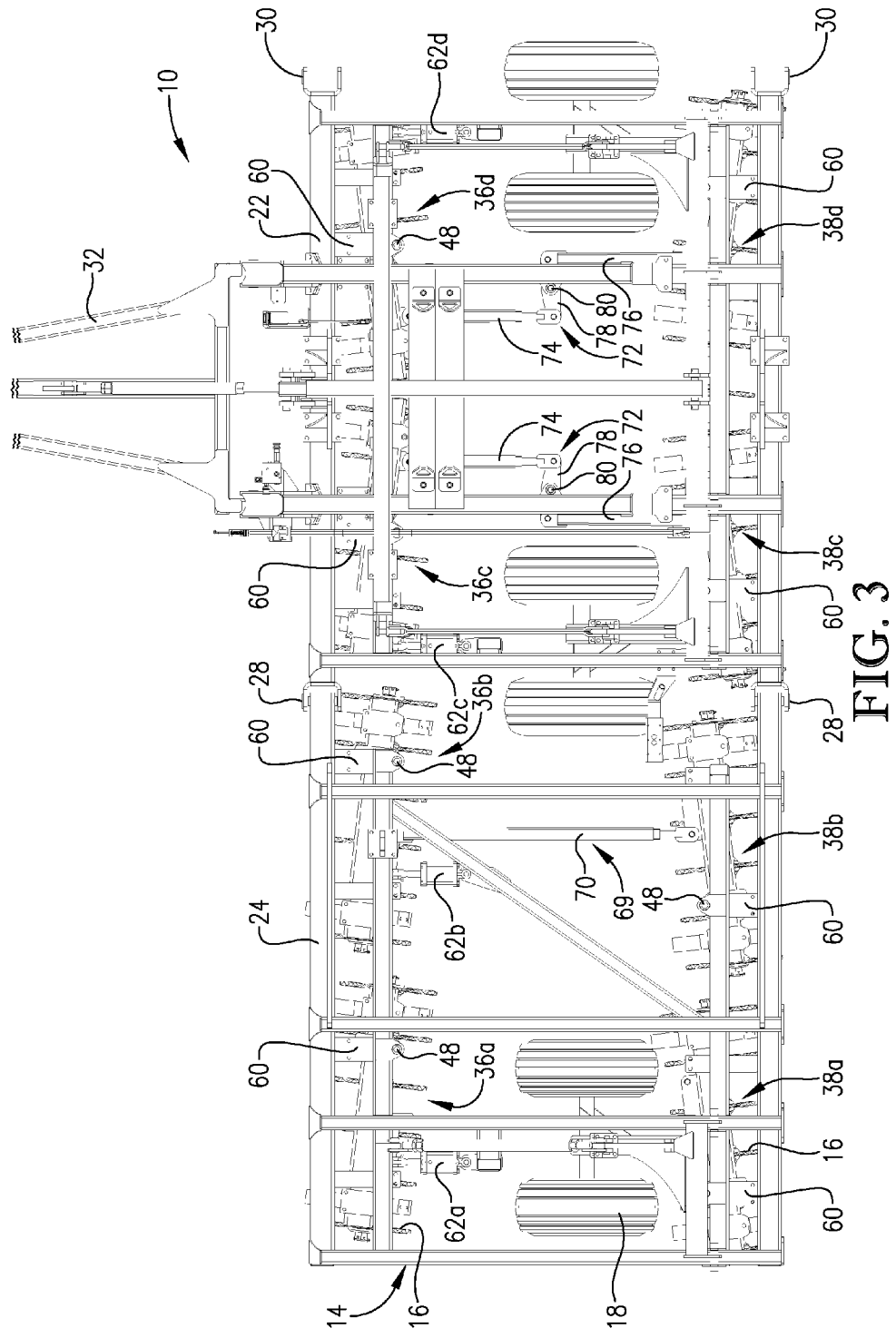
FIG. 3 is an enlarged, fragmentary top plan view of the machine with the right wing section removed, the gang assemblies being illustrated in their most angled, residue management positions.
Figure 4:
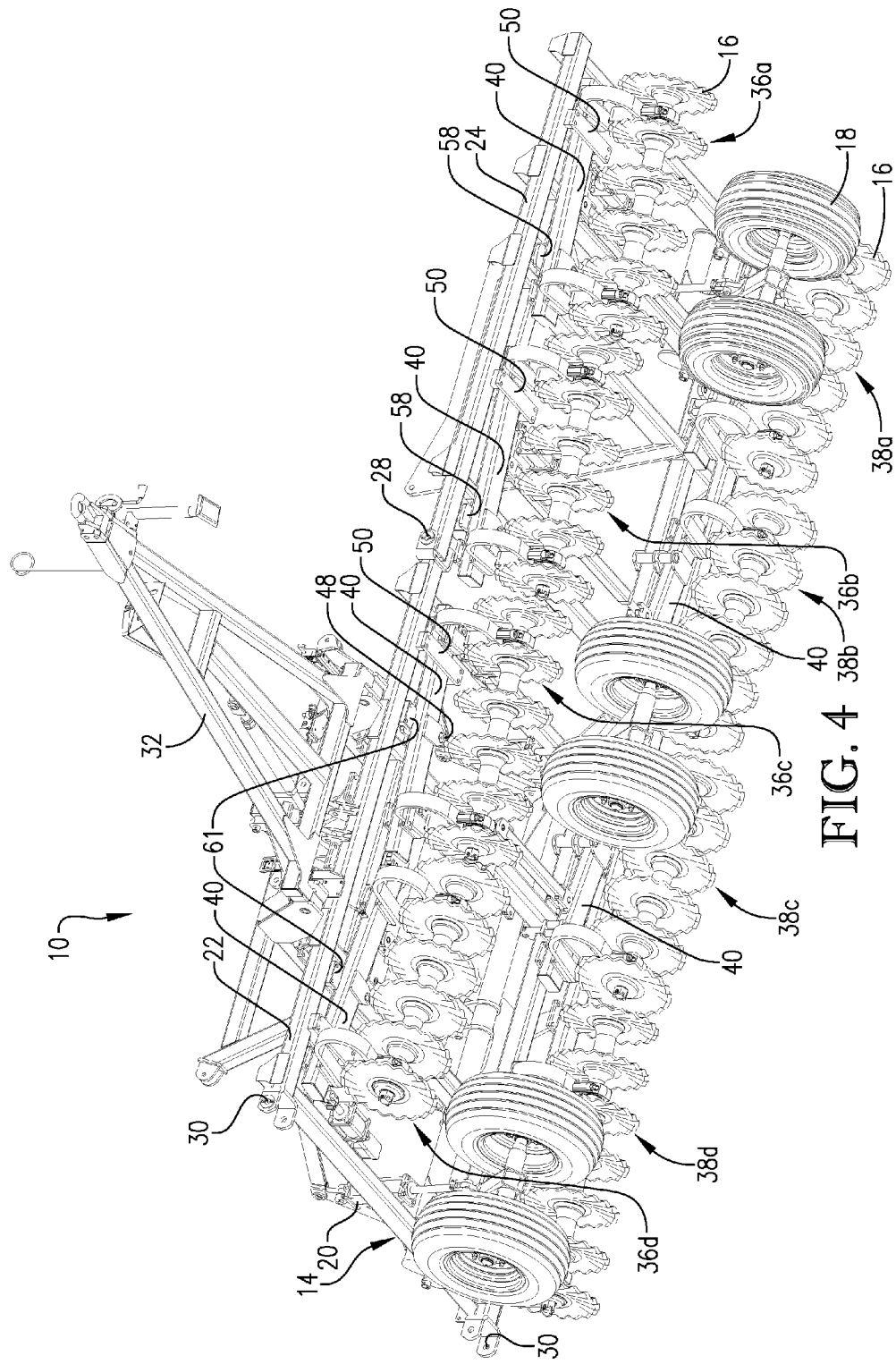
FIG. 4 is a left, front, bottom perspective view of the machine with the right wing section removed.

In the illustrated embodiment, frame 14 comprises a three-section frame, having a center section 22 and a pair of left and right wing sections 24 and 26 respectively that are hingedly connected to center section 22 for vertical hinging movement about respective fore-and-aft axes defined by hinges 28 and 30 (see also FIG. 2). Hinges 28, 30 also permit wing frame sections 24, 26 to be raised into folded positions for transport by hydraulic actuators not shown in detail in the drawings. A tongue 32 projects forwardly from center frame section 22 for hitching implement 10 to tractor 12. Hydraulic lines (not shown) connect the usual internal hydraulic system of tractor 12 with hydraulic actuators 20 and other hydraulic actuators of implement 10 as hereinafter described.

Figure 12:
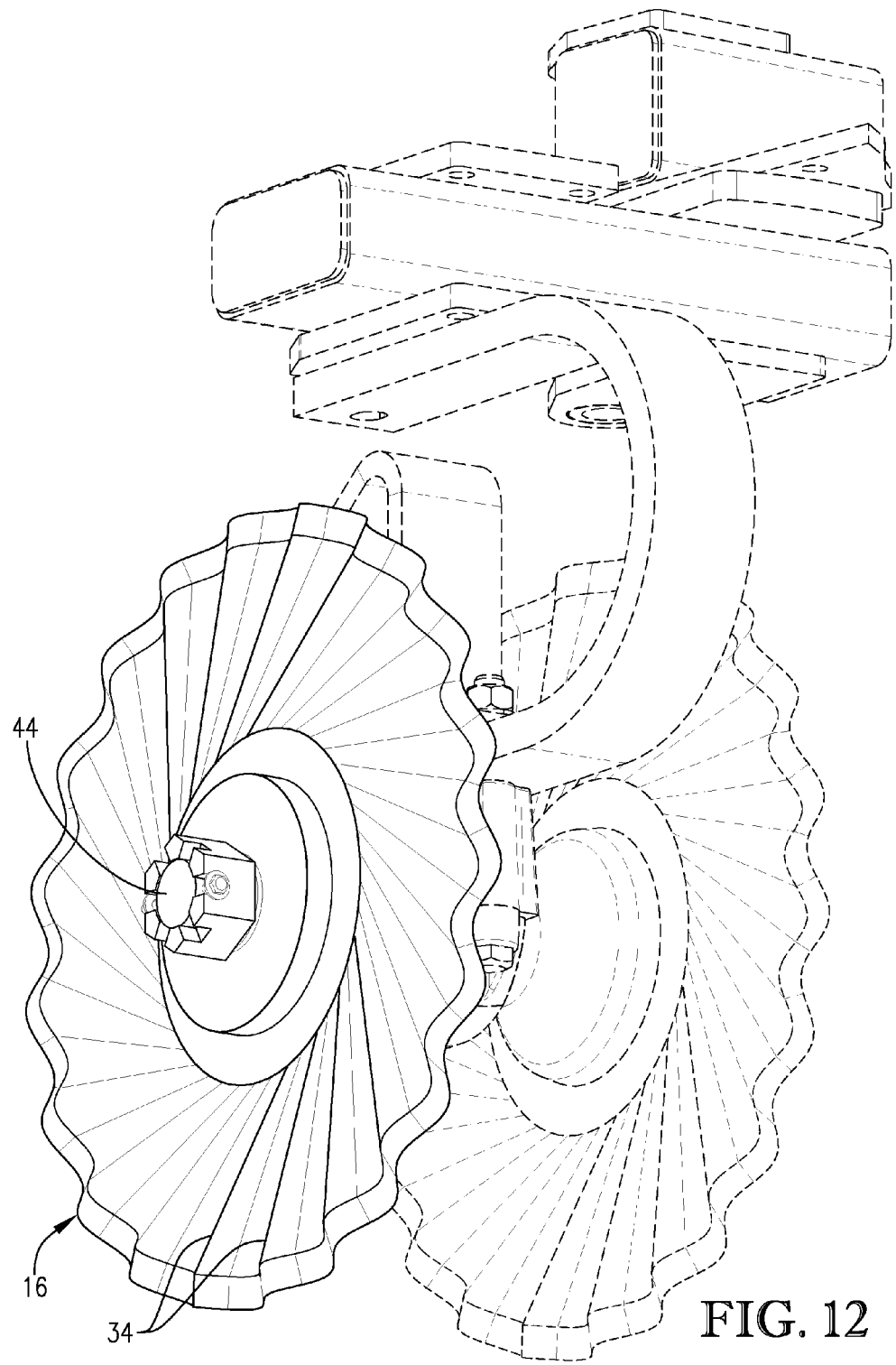
FIG. 12 is an enlarged front perspective view of a typical coulter used as the tilling tool.

In one preferred embodiment of the invention, wherein the implement 10 comprises a combination vertical tillage and residue management machine, the rotating tillage tools 16 comprise coulter blades as contrasted to concavo-convex discs or other devices. Such coulters may be totally flat with a non-wavy body but are preferably provided with lateral projections such as those presented by the waves of a wavy-bodied coulter. As illustrated in FIGS. 12 and 13, for example, such a wavy coulter, although generally flat in overall configuration, has waves that present alternating crests and valleys defining adjacent lines 34. In a most preferred embodiment, lines 34 do not extend in a truly radial direction but are instead arranged to extend somewhat obliquely relative to an imaginary radius from the axis of rotation of the coulter to the outer periphery of the coulter. These coulters are mounted in such a way that the lines 34 enter the soil more vertically than would otherwise be the case in the lower front quadrant of the coulter so as to chop and fracture the soil in a light tillage action. Coulters of this type have been utilized for several years on the Great Plains TURBO-TILL series of implements and may be obtained from Osmundson Manufacturing Company of Perry, Iowa. Coulters of this type are also disclosed in U.S. Pat. No. 5,649,602, which is hereby incorporated by reference into the present specification for a more complete disclosure of such coulters.

Tools 16 comprise parts of a multiplicity of elongated gang assemblies supported by frame 14. In a preferred embodiment, such gang assemblies are arranged generally end-to-end in a front row across the front of frame 14 and in a rear row across the rear of frame 14. In the illustrated embodiment, each frame section 22, 24, and 26 supports two front gang assemblies and two rear gang assemblies. Thus, left wing frame section 24 carries front gang assemblies 36a and 36b, center frame section 22 carries front gang assemblies 36c and 36d, and right frame section 26 carries front gang assemblies 36e and 36f. Similarly, left frame section 24 carries rear gang assemblies 38a and 38b, center frame section 22 carries rear gang assemblies 38c and 38d, and right frame section 26 carries rear gang assemblies 38e and 38f.

Figure 10:
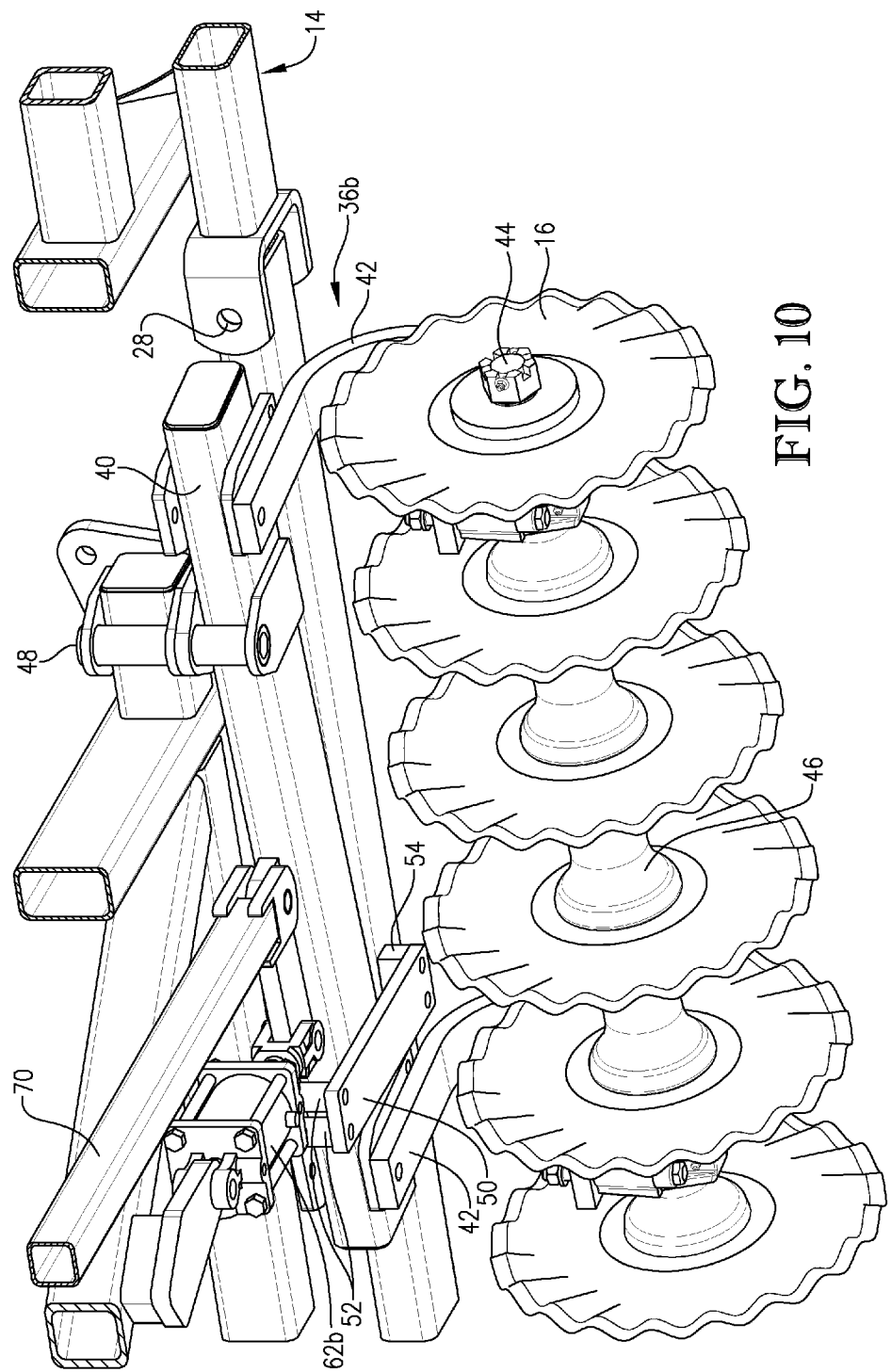
FIG. 10 is an enlarged, fragmentary, bottom perspective view illustrating the pivot and beam support of a typical gang assembly.

As illustrated by gang assembly 36b in FIG. 10, each gang assembly 36, 38 includes a transversely extending gang beam 40 provided with a pair of downwardly projecting, curved mounting straps 42 adjacent its opposite inboard and outboard ends. Straps 42, in turn, support a gang of the tools 16 on a shaft 44 that is rotatably supported by suitable bearings at the lower ends of straps 42. Shaft 44 thus defines the common axis of rotation of tools 16 and extends parallel to beam 40 such that tools 16 lie in planes that are normal to the longitudinal axis of beam 40. Tools 16 are maintained in mutually spaced apart relationship along shaft 44 by a series of spacers 46. Each gang beam 40 is attached to the underside of frame 14 by its own vertical pivot 48. Thus, pivots 48 adapt the gang assemblies 36, 38 for horizontal adjusting movement about the vertical axes defined by pivots 48.

Figure 9:
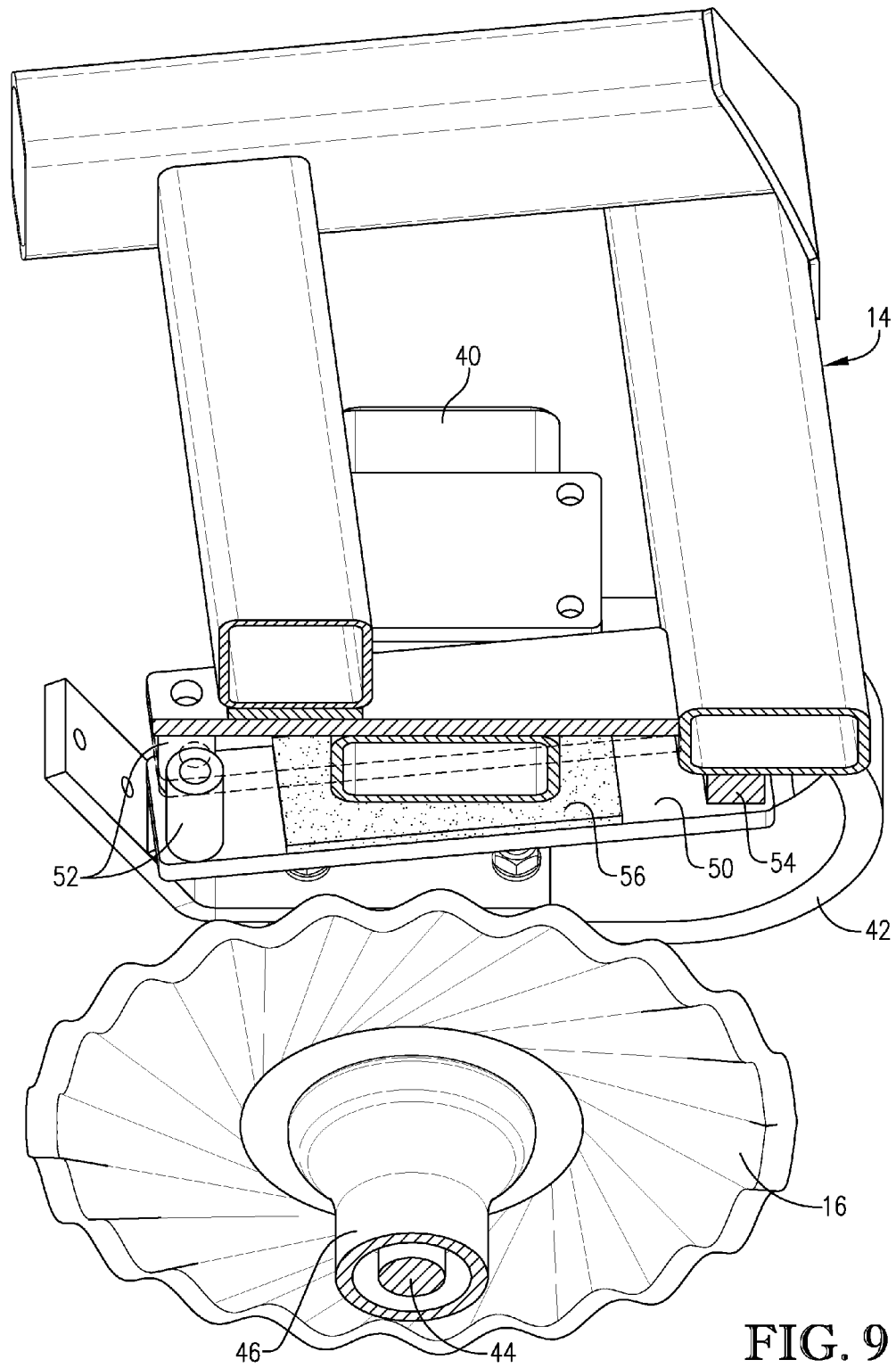
FIG. 9 is an enlarged, fragmentary, top perspective view illustrating the manner in which the free ends of the beams of the adjustable gang assemblies are supported at locations spaced from their pivots.

As illustrated in detail in FIGS. 9 and 10, at a location spaced longitudinally from its pivot 48, each gang beam 40 is supported from below by a guide plate 50 suspended beneath and in vertically spaced relation to frame 14. Each guide plate 50 is suspended from frame 14 by a pair of upright rear posts 52 and an upright front block 54. In addition to attaching guide plate 50 to frame 14, posts 52 and block 54 serve as stops at opposite ends of the path of adjusting movement of beam 40 to define the limits of travel thereof. An anti-friction slide plate 56 (FIG. 9) may be provided on the top surface of guide plate 50, if desired, for sliding engagement with the underside of gang beam 40 during its fore-and-aft movement.

Figure 11:
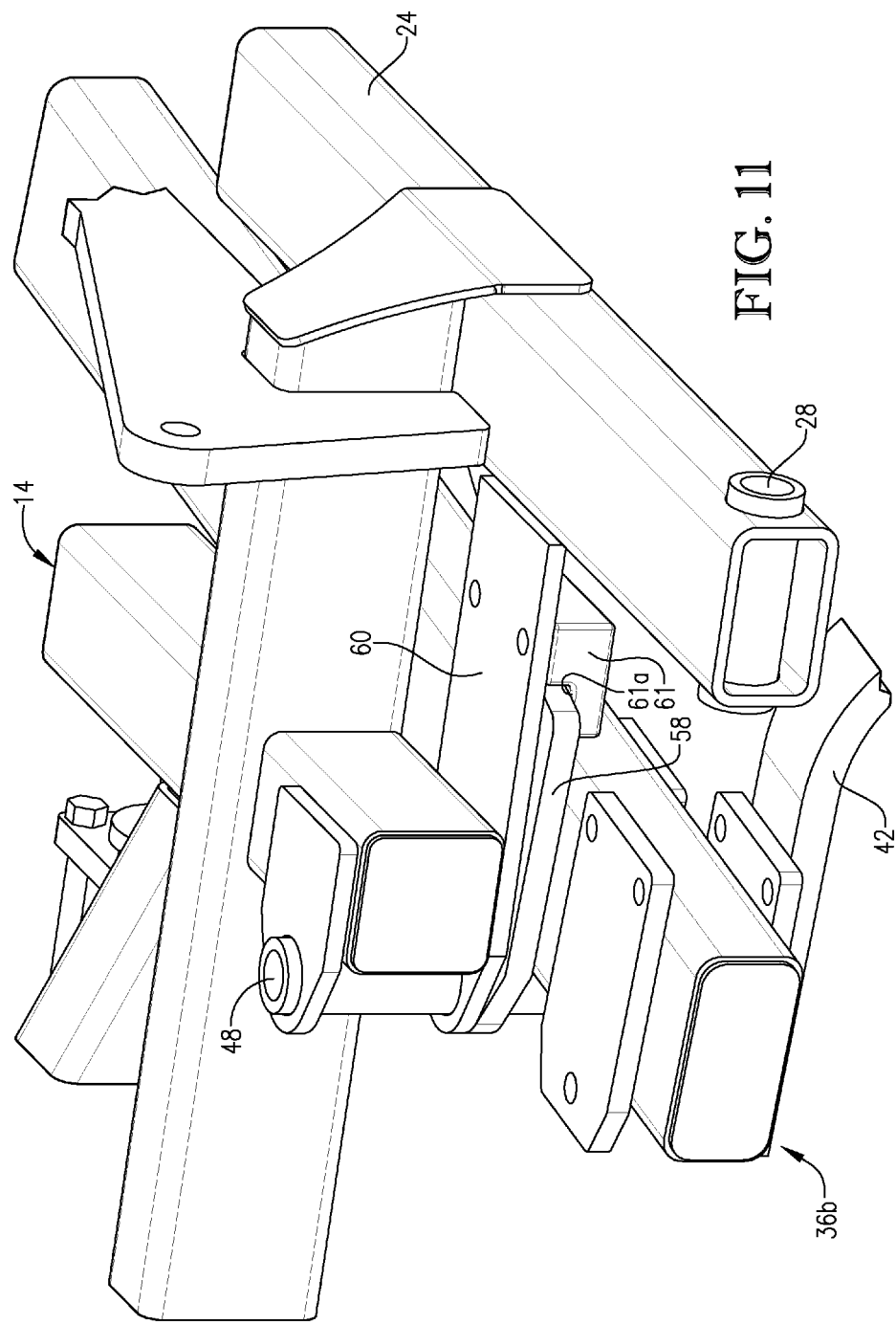
FIG. 11 is an enlarged, fragmentary, top perspective view of support structure associated with the pivot of a typical gang assembly.

As illustrated particularly in FIG. 11, associated with each pivot 48 is an upper tab 58 that is fixed to the upper surface of gang beam 40 and projects laterally outwardly therefrom in a cantilevered manner for pivoting movement with beam 40 about the axis of pivot 48. Tab 58 is sandwiched between a stationary overhead plate 60 and the underlying ledge 61a of a stationary, generally hook-shaped block 61. Upper plate 60 is fixed at its opposite ends to portions of frame 14, while hook block 61 is bolted to plate 60. Confining the tab 58 in this manner between lower hook block 61 and overhead plate 60 helps relieve loading on pivot 48 during operation (with the exception of FIG. 11, hook blocks 61 are shown in the Figures on center frame section 22 but have been removed for clarity on wing frame sections 24 and 26).

In a preferred form of the invention, the front gang assemblies 36 are adjusted by suitable remotely operated actuators. Such actuators may take a variety of different forms, such as, for example, electric motors, pneumatic cylinders, or hydraulic actuators such as hydraulic motors or hydraulic cylinders. Preferably, and as hereinafter described in the disclosed exemplary embodiment, the actuators comprise hydraulic actuators such as double-acting hydraulic cylinders. Thus, front gang assembly 36a is operated by a double-acting hydraulic actuator 62a, front gang assembly 36b is operated by a double-acting hydraulic actuator 62b, front gang assembly 36c is operated by a double-acting hydraulic actuator 62c, front gang assembly 36d is operated by a double-acting hydraulic actuator 62d, front gang assembly 36e is operated by a double-acting hydraulic actuator 62e, and front gang assembly 36f is operated by a double-acting hydraulic actuator 62f.

Hydraulic actuators 62 could be plumbed in a variety of arrangements, including a parallel flow relationship, but preferably they are plumbed in a special master-slave series circuit to help assure that front gang assemblies 36 all operate in unison. More specifically, the two actuators 62c and 62d on center frame section 22 comprise a pair of master hydraulic actuators that are plumbed in parallel flow relationship via a single supply line (not shown) from tractor 12, the single line having a Tee connection at its rear end with a pair of branch lines leading to respective ones of the master actuators 62c, 62d. The actuators of the wing sections comprise slave actuators to their respective masters and are successively stepped down in internal diameter as the outboard end of the implement approached. Thus, taking the left half of the machine as an example, actuator 62c is a master to the slightly decreased diameter slave actuator 62b, which is, in turn, a master to the further reduced diameter slave actuator 62a. Consequently, when master actuator 62c is extended, slave actuators 62b and 62a are also simultaneously extended. A branch return line (not shown) from slave actuator 62a leads back to a Tee connection with a common return line to the tractor hydraulics, the right half of the implement likewise having a branch return line from outermost slave actuator 62f to the common return line.

Figure 7:
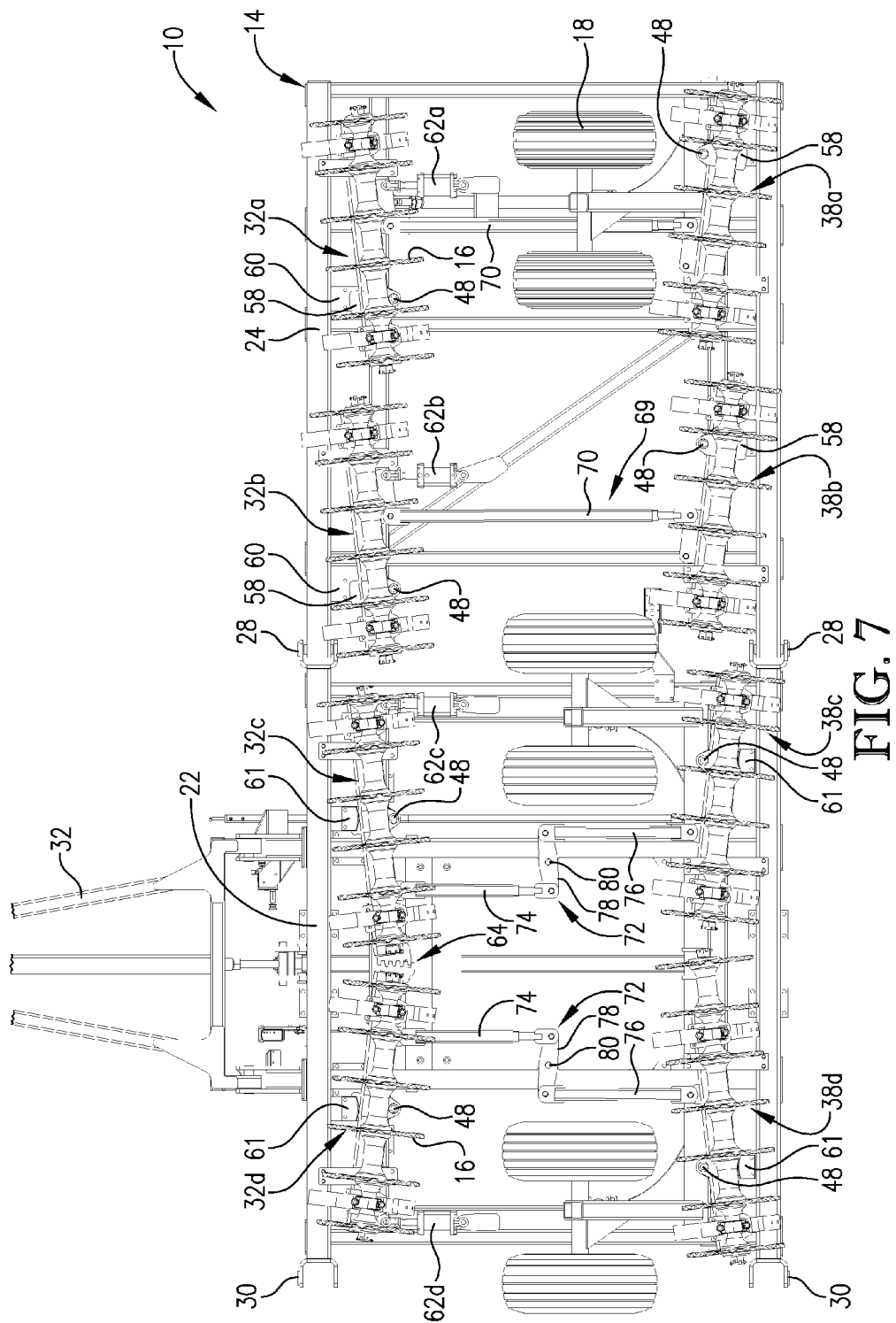
FIG. 7 is an enlarged, fragmentary bottom plan view of the machine showing the gangs in their most angled, residue management positions, the right wing section being removed.
Figure 8:
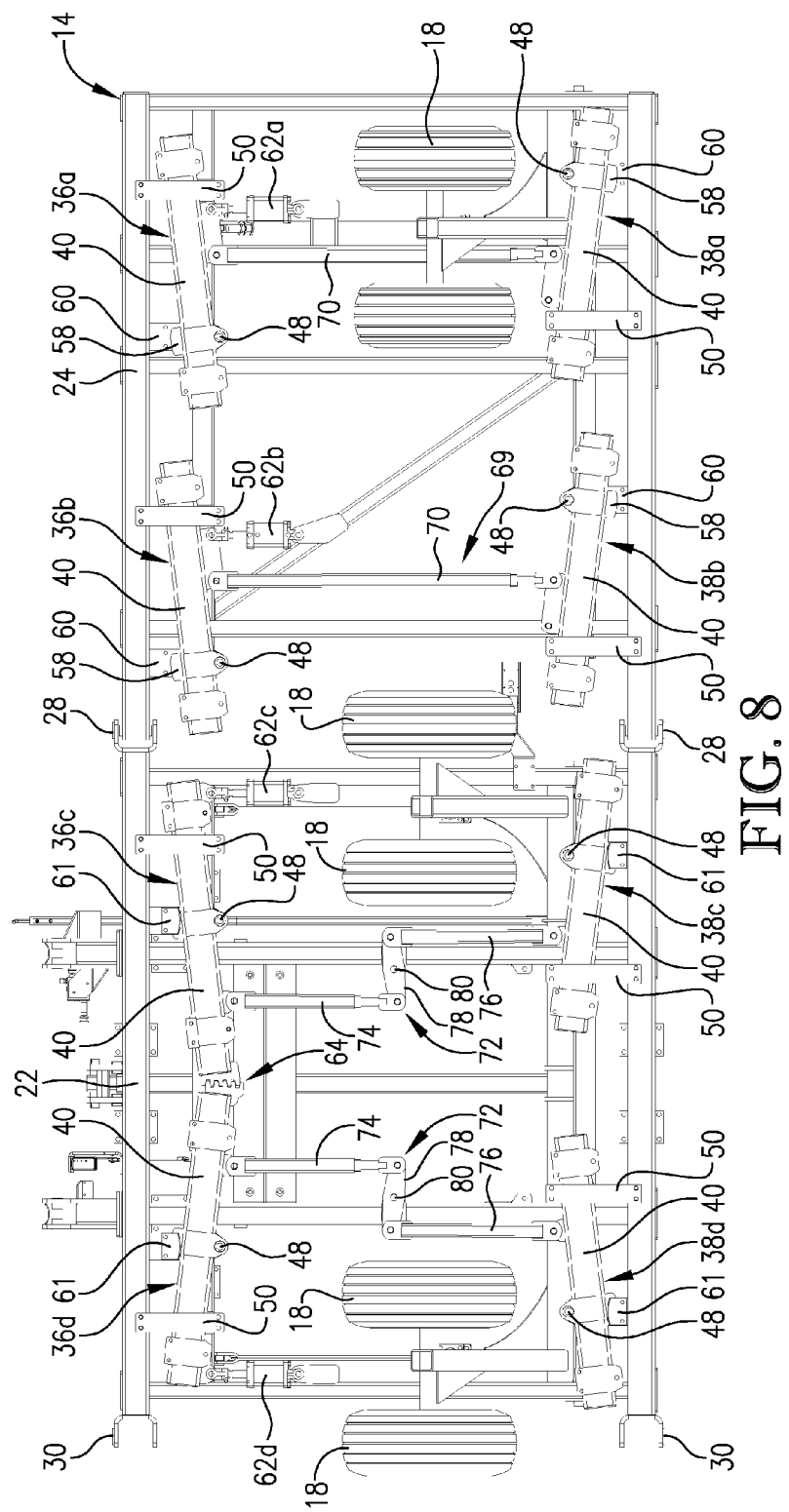
FIG. 8 is an enlarged, fragmentary bottom plan view of the machine similar to FIG. 7 but with the tools of the gang assemblies removed to reveal details of construction of the gang beams, synchronizing apparatus, and motion-transmitting linkage mechanism.

The front gang assemblies 36c and 36d of center frame section 22 are mechanically synchronized in their adjusting movement by synchronizing apparatus broadly denoted by the numeral 64 (FIGS. 7, 8 and 13). It will be noted that during angular adjustment of the front gang assemblies 36c and 36d of center frame section 22, such assemblies swing in mutually opposite directions. Thus, synchronizing apparatus 64 comprises a pair of intermeshing gear segments 66 and 68 projecting in an inboard direction from the proximal ends of their respective gang assemblies 36c, 36d. Each gear segment 66, 68 has a series of teeth 70 arranged in an arc that has its center of curvature at the pivot 48 of the respective gang assembly. Therefore, even though the two master actuators 62c, 62d on center frame section 22 are plumbed in parallel to one another, the mechanical interconnection between the two assemblies provided by synchronizing gear segments 66, 68 assures that the two assemblies always move in unison, thus also synchronizing the front gang assemblies of wing sections 24 and 26.

Adjusting motion of the front gang assemblies 36 is transmitted to the rear gang assemblies 38 by mechanical linkage mechanism broadly denoted by the numeral 69. Such mechanism 69 includes for the gang assemblies 36a, 38a of left frame section 24 linkage in the form of a single fore-and-aft link 70 extending between and interconnecting the two gang beams 40 of assemblies 36a, 38a. Mechanism 69 includes the same type of similarly connected single link 70 for gang assemblies 36b and 38b of left frame section 24, as well as for the front and rear gang assemblies of right wing frame section 26.

With particular reference to FIG. 8, it will be appreciated that rear gang assemblies 38 must be pivoted in a direction that is opposite to that of their corresponding front gang assemblies 36 during angle adjustment. Thus, using front gang assembly 36b and rear gang assembly 38b as an example, in order to impart such reversal of pivoting movement utilizing only a single link 70, it is necessary that the pivot 48 for front gang assembly 36b be offset in a lateral direction from pivot 48 for corresponding rear gang assembly 38b. It will be noted in this respect that pivot 48 for front gang assembly 36b is located generally adjacent the inboard end of assembly 36b, while pivot 48 for rear gang assembly 38b is located generally adjacent the outboard end of assembly 38b. The front end of link 70 is thus connected on one side of pivot 48 for front assembly 36b, while the rear end of link 70 is connected on the opposite side of pivot 48 for rear assembly 38b. Therefore, viewing FIG. 8 for example, when front gang assembly 36b is moved in a clockwise direction about its pivot 48 by actuator 62b, link 70 pushes rear gang assembly 38b in a counter-clockwise direction about its pivot 48. Conversely, when front gang assembly 36b is pivoted in a counter-clockwise direction about its pivot 48 by actuator 62b, link 70 pulls rear gang assembly 38b in a clockwise direction about its pivot 48.

Motion-transmitting mechanism 69 further includes what may be described as a double link linkage 72 for each front and rear set of gang assemblies on center frame section 22. Although a single link linkage like link 70 could theoretically be used for each set of front and rear gang assemblies on center frame section 22, the particular location of ground wheels 18 on center frame section 22 in the illustrated embodiment causes spacing problems that make the use of a single link somewhat problematic. Therefore, in the illustrated embodiment a double link linkage 72 is preferable. Although the construction of double link linkage 72 differs from that of single link linkage 70, the net result is the same.

Using the gang assemblies 36c and 38c as an example in FIG. 8, linkage 72 for that pair of assemblies includes a front link 74 extending rearwardly from front gang assembly 36c toward rear gang assembly 38c, a rear link 76 projecting forwardly from rear gang assembly 38c toward front gang assembly 36c, and an intermediate reversing lever 78 that is pivotally connected to frame section 22 by an upright pivot 80. One end of lever 78 is pivotally connected to the rear end of front link 74, while the opposite end of lever 78 is pivotally connected to the front end of link 76. Links 74 and 76 are connected to their respective gang assemblies on the same side their pivots 48. Thus, as viewed in FIG. 8, when front gang assembly 36c is swung in a clockwise direction about its pivot 48 by actuator 62c, front link 74 pulls lever 78 in a clockwise direction, which pushes rear link 76 rearwardly to swing rear gang assembly 38c in a counter-clockwise direction. Correspondingly, when front gang assembly 36c is swung in a counter-clockwise direction by actuator 62c, front link 74 pushes lever 78 in a counter-clockwise direction to pull on rear link 76 and swing rear gang assembly 38c in a clockwise direction. It will be noted that although pivots 48 of gang assemblies 36c and 38c are somewhat laterally offset from one another in the illustrated embodiment, such pivots could be disposed in fore-and-aft mutual alignment without requiring significant changes to double linkage 72.

Operation

As the implement 10 is pulled across a field by tractor 12, tools 16 engage and work the soil. FIG. 14b illustrates the implement set up for vertical tillage with tools 16 comprising wavy coulter blades. In this configuration, all coulters 16 are disposed at a zero degree angle relative to the path of travel of the implement, i.e., coulters 16 are positioned straight ahead in parallel alignment with the implement's path of travel such that their axes of rotation are normal to such path of travel. In such vertical tillage position, the blade-like coulters 16 cut through stalks and other residue while creating relatively narrow strips of tilled soil with little turning or throwing of the soil laterally. The alternating crests and valleys of the wavy-bodied coulters provide good fracturing and tilling of the soil that is engaged by the coulters, while the non-radial orientation of the lines 34 between the valleys and crests helps assure that the waves enter the soil more vertically in the lower front quadrant with less soil compaction than would otherwise be the case.

Figure 14A:
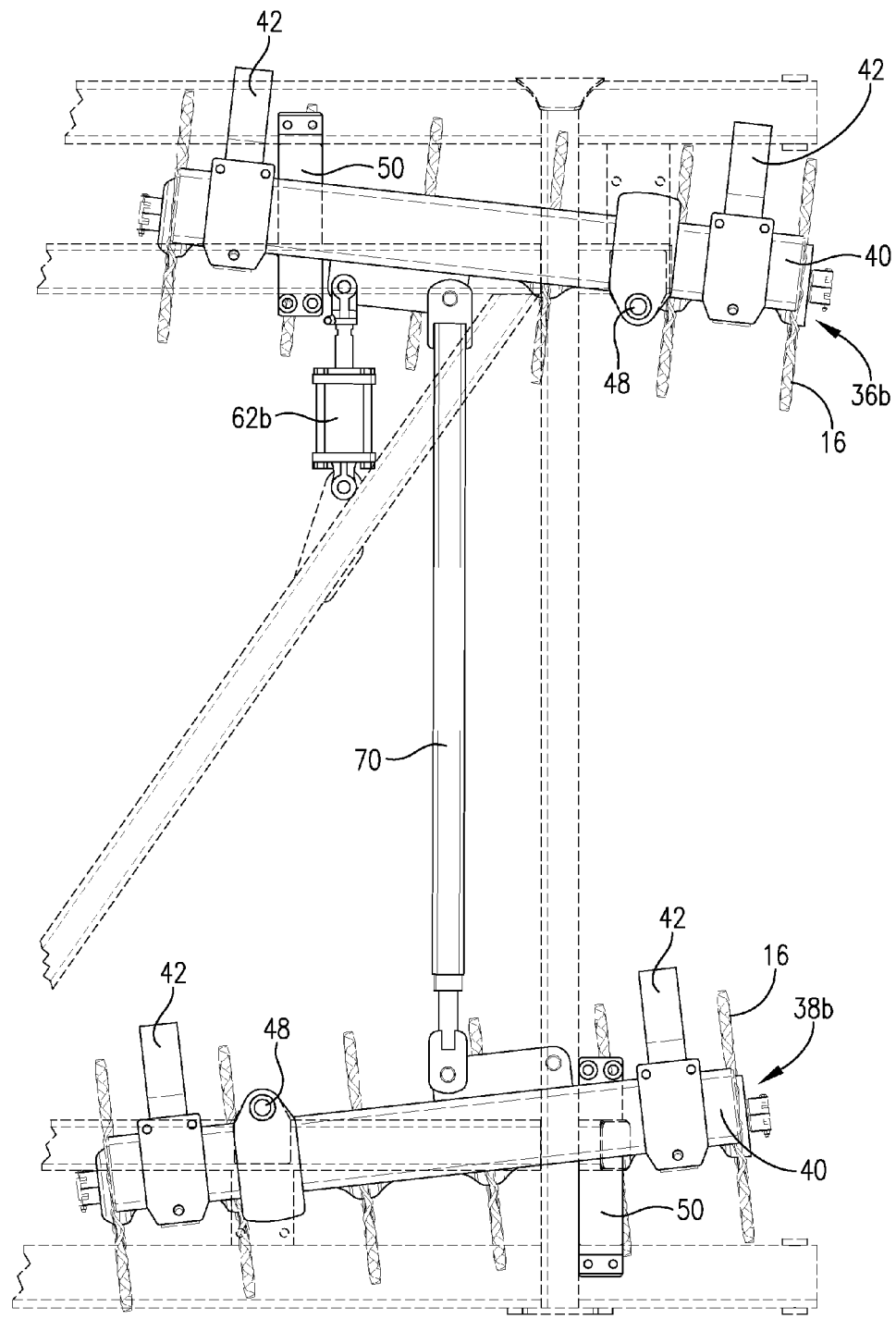
FIG. 14a is an enlarged, fragmentary top plan view showing a typical set of front and rear gang assemblies in their oblique residue management positions.
Figure 14B:
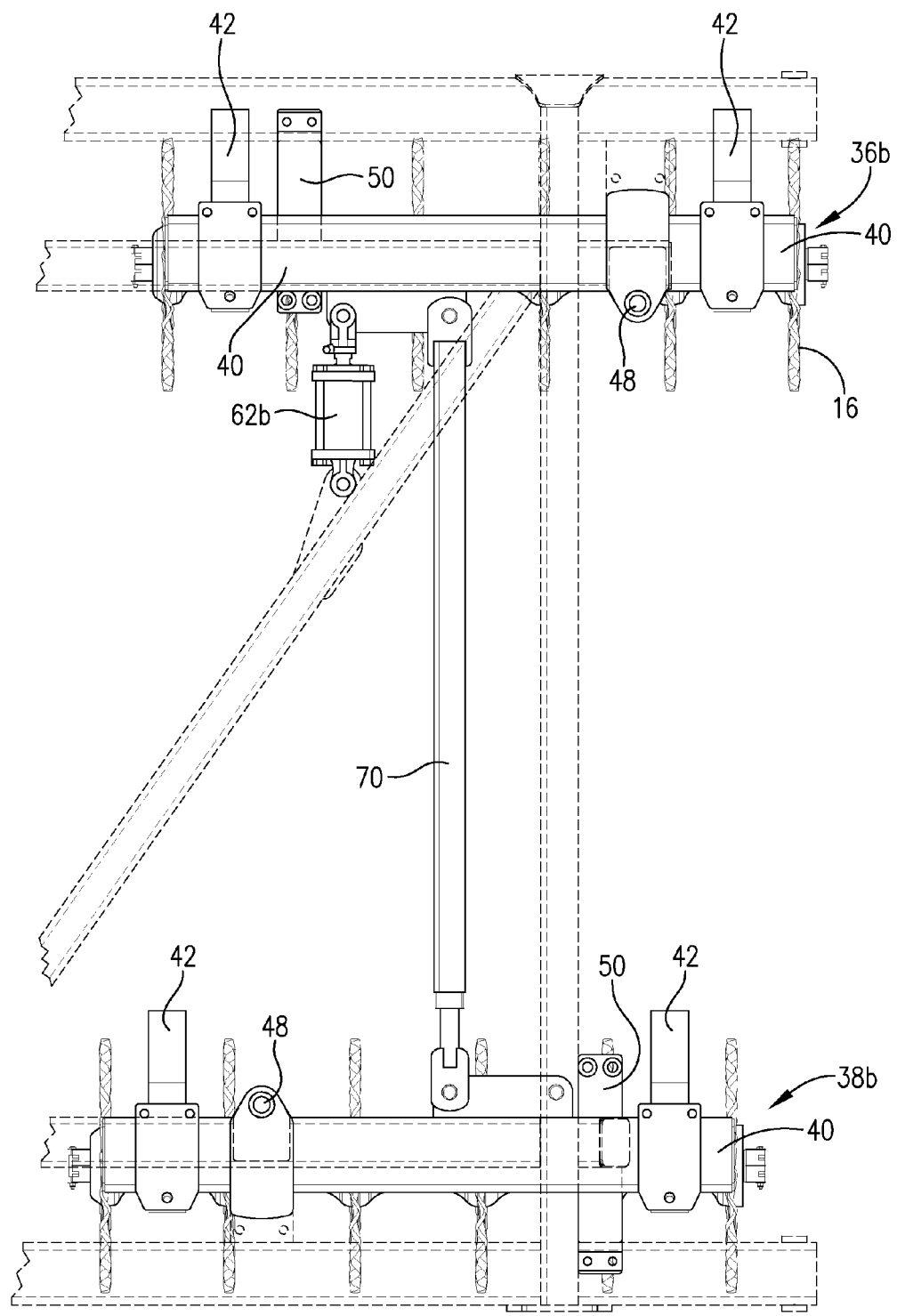
FIG. 14b is an enlarged, fragmentary top plan view showing the gang assemblies of FIG. 14a in their straight-ahead, vertical tillage positions.

FIG. 14a illustrates implement 10 set up in a residue management configuration with the axes of rotation of the coulters all disposed at oblique angles relative to the path of travel of the machine. The front gang assemblies 36 are all angled inwardly and rearwardly, while all of the rear gang assemblies are angled inwardly and forwardly. Consequently, soil that is thrown laterally outwardly by front gang assemblies 36 is substantially returned back inwardly by rear gang assemblies 38, all of which not only thoroughly works the soil but also covers and incorporates stalks and other residue.

It has been found that the relatively flat coulters 16 not only do a good job of vertical tilling when in the vertical tillage position of FIG. 14b, but also do a good job of more aggressively working the soil and incorporating crop residue when in their oblique residue management position of FIG. 14a. Good results have been obtained when the gang assemblies 36 and 38 are set up for angular adjustment in the range of from zero degrees to between five and ten degrees relative to the implement's path of travel, with from zero degrees to six degrees being the most preferred range. Excellent residue incorporation has been achieved with the coulters at a six degree angle.

It will be appreciated that angular adjustment of the gang assemblies can be remotely carried out from the tractor seat and in incremental amounts. If the implement is stationary when adjustment is desired, it is best to first raise the implement until the tools 16 are off the ground. However, it will also be appreciated that the present invention permits gang angle adjustment "on-the-go" while tools 16 are still engaging and working the soil. By simply shifting an appropriate lever near the tractor seat in an appropriate direction and for an appropriate length of time, the operator may adjust the gang angle to a more aggressive or less aggressive position as conditions dictate. For example, although the operator may initially have the gang assemblies set up in the vertical tillage position with coulters aligned with the implement's path of travel, he may encounter ditches or wheel tracks or other zones that call for more lateral soil movement than possible in the vertical tillage position. In that instance, he simply adjusts the gang angle in the appropriate direction without stopping forward progress of the implement, utilizes the gang assemblies in their more aggressive until no longer needed, and then returns the gang assemblies to their vertical tillage position. Similarly, he may encounter times when, temporarily, the gang angle needs to be adjusted on-the-go for greater or lesser incorporation of crop residue.

This gang angle adjustment is accomplished by simply actuating the hydraulic actuators 62. Due to the special master-slave relationship between master actuators 62c, 62d of center frame section 22 and their respective wing section actuators, simultaneous actuation of all actuators in the series is assured, as well as a uniform amount of such actuation. Furthermore, the synchronizing gear segments 66, 68 on the two front gang assemblies 36 of center frame section 22 assure that both the left and right front halves of the implement operate in a synchronized manner.

Moreover, by virtue of the mechanical motion-transmitting mechanism 69, it is assured that all rear gang assemblies 38 on the machine are operated simultaneously with the front gang assemblies 36 and in uniform amounts when hydraulic actuators 62 are actuated. The relatively simple nature of motion transmitting linkages 70 and 72, with an absence of loose ball joints and the like, helps reduce "slack" in the linkage system that would otherwise work against properly synchronized operation and uniform displacement.

It should be apparent from the foregoing that not all aspects of the present invention are limited to using coulters as the rotating tillage tools 16. While one aspect of the invention is indeed directed to a more versatile vertical tillage machine wherein relatively flat coulters can be readily and conveniently adjusted between vertical tillage and residue management positions, other aspects such as hydraulic actuation, mechanical synchronization, and mechanical motion-transmitting linkage between front and rear gang assemblies can be utilized in connection with concavo-convex discs and other rotatable tillage devices as well as with generally flat coulters. Thus, the principles of the present invention are, in some aspects, usable on a wide variety of implements employing gangs of rotating tillage tools.

Moreover, it will be appreciated that instead of requiring human intervention, the actuators for adjusting on the machine's gang angle could be computer-controlled so as to manage both the timing and extent of angle adjustment in response to various sensed conditions and factors. For example, a computer could be programmed to utilize GPS and RTK technology via an ISOBUS system on the tractor, adjusting the gang angle based upon such factors as location in the field, tractor speed, tillage depth, soil moisture, residue cover, and weed pressure. Moreover, the computer could be programmed to carry out its control functions without regard to the presence or absence of a human operator (remote or autonomous operation), or without regard to whether the tractor was being manually or automatically steered.

Alternative Embodiment

Figure 15:
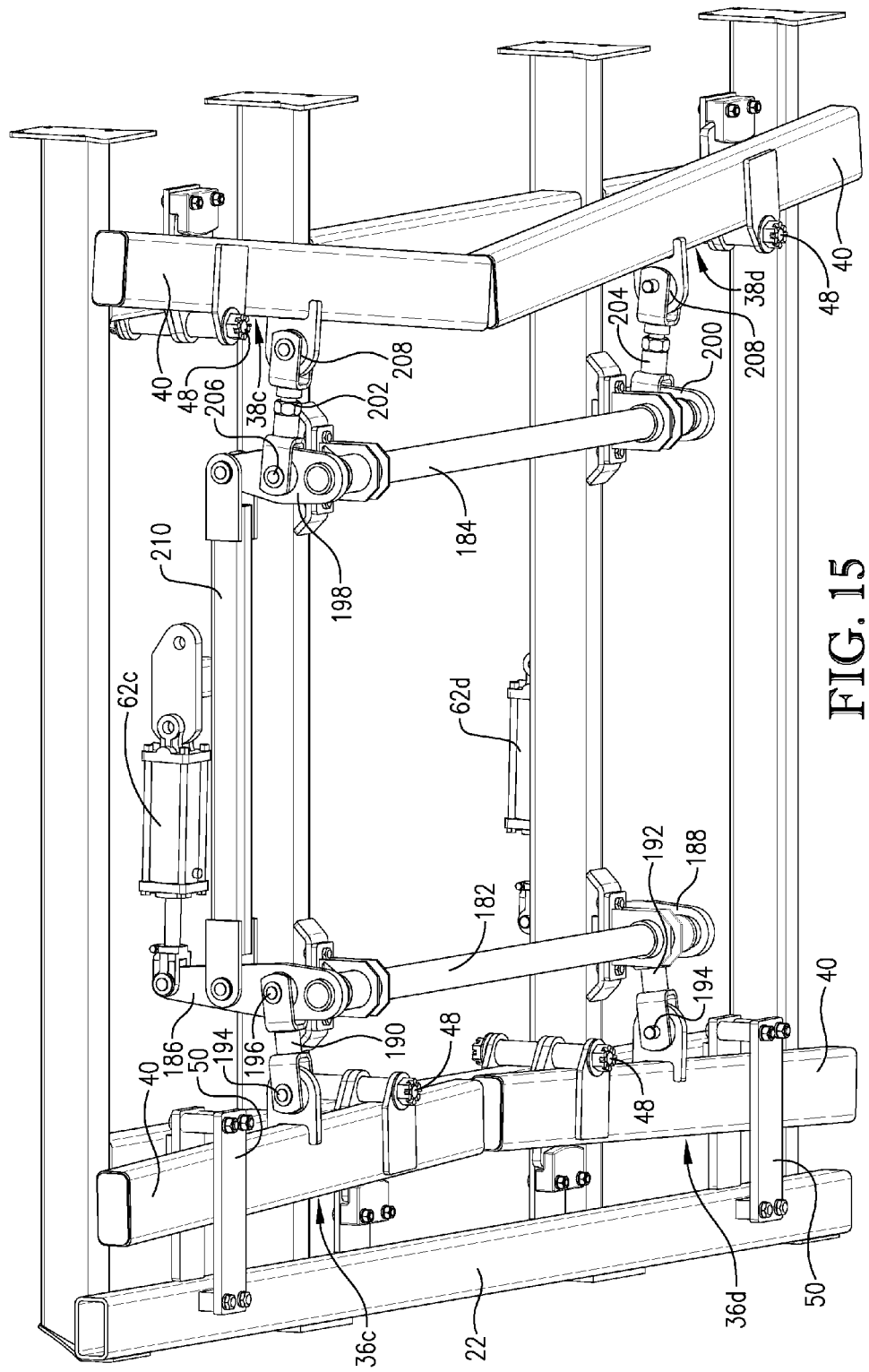
FIG. 15 is an enlarged, fragmentary, bottom perspective view of an alternative embodiment of synchronizing apparatus and motion-transmitting linkage for the center gang assemblies machine.
Figure 16:
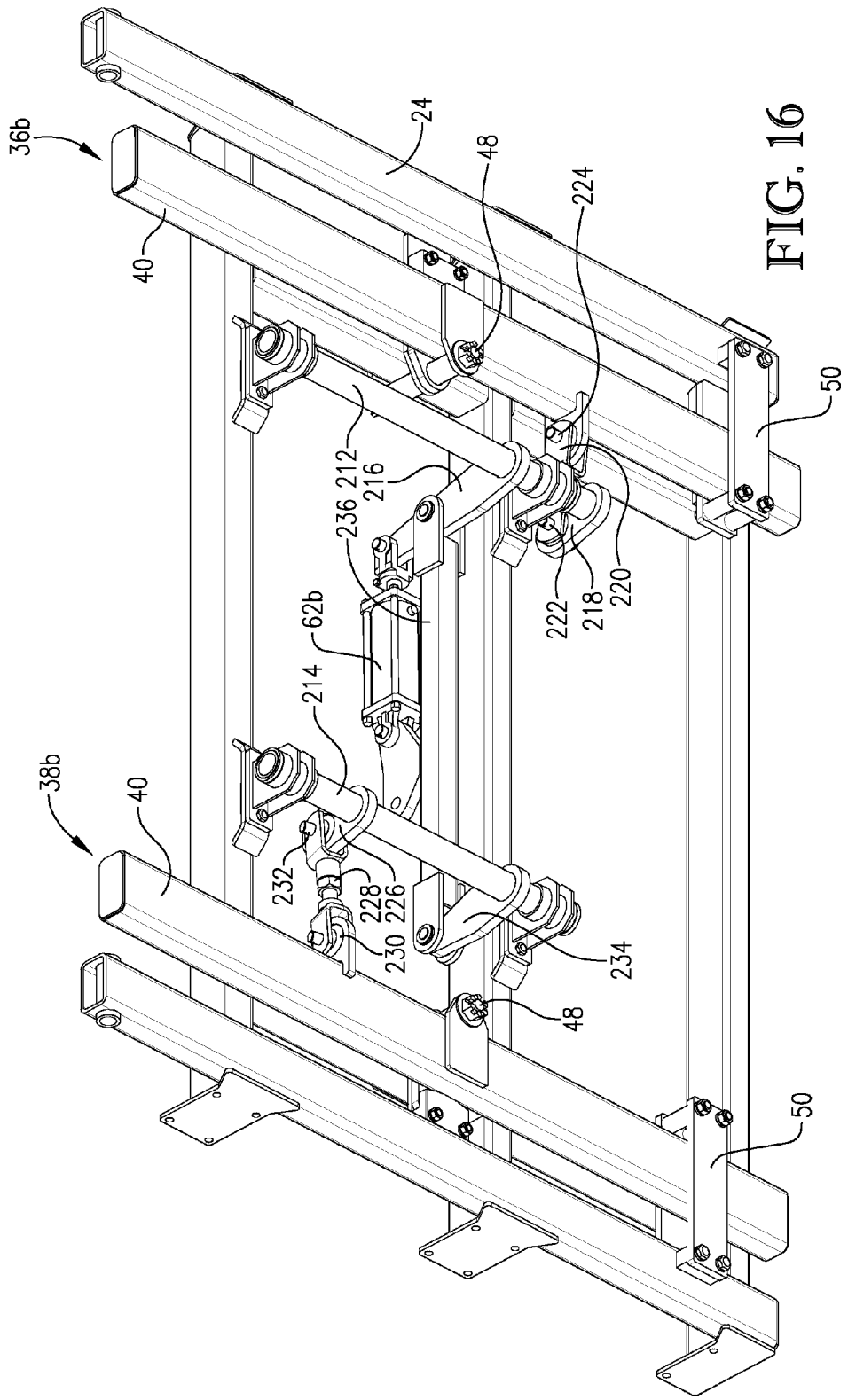
FIG. 16 is an enlarged, fragmentary, bottom perspective view of an alternative embodiment of motion-transmitting linkage for a typical wing gang assembly of the machine.

FIGS. 15 and 16 are directed to an alternative arrangement for synchronizing movement of gang assemblies 36c and 36d of center frame section 22, and to an alternative arrangement for transmitting motion to the rear gang assemblies of the center and wing frame sections.

Referring initially to FIG. 15, center frame section 22 has a pair of fore-and-aft spaced, transverse rockshafts 182 and 184 attached to the bottom side of frame section 22 for rotation about their respective longitudinal axes. A pair of upright crank arms 186 and 188 are fixed to opposite ends of front rockshaft 182, and the hydraulic actuators 62c and 62d are connected to the respective crank arms 186, 188 at their upper ends. A first coupling 190 is connected between crank arm 186 and beam 40 of gang assembly 36c, while a second coupling 192 is connected between crank arm 188 and beam 40 gang assembly 36d. Each coupling 190, 192 is preferably provided with ball joints 194 and 196 at its opposite ends. Consequently, actuation of hydraulic actuators 62c and 62d causes fore-and-aft angle adjustments of gang assemblies 36c and 36c, while rockshaft 182 synchronizes adjusting movement of the two gang assemblies.

Rear rockshaft 184 has a pair of upright crank arms 198 and 200 fixed to its opposite ends. A first coupling 202 is connected between crank arm 198 and beam 40 of rear gang assembly 38c, while a second coupling 204 is connected between crank arm 200 and beam 40 of rear gang assembly 38d. Each coupling 202, 204 has a pair of ball joints 206 and 208 at its opposite ends. A single fore-and-aft link 210 is connected between front crank arm 186 and rear crank arm 198 for transmitting motion of the front gang assemblies to the rear gang assemblies, it being noted that the rotary motion of rear rockshaft 184 is translated into horizontal movement of the rear gang assemblies by virtue of the couplings 202 and 204. Likewise, the rotary motion of front rockshaft 182 is translated into horizontal movement of the front gang assemblies 36 by virtue of the couplings 190 and 192. If desired, a second fore-and-aft link 212 (not shown) may be connected between front crank arm 182 and rear crank arm 200.

FIG. 16 illustrates a typical alternative arrangement for the motion transmitting mechanism associated with the front and rear gang assemblies of the wing frame sections. In the illustrated example, the gang assemblies are gang assemblies 36b and 38b of wing frame section 24. In this construction, a pair of fore-and-aft spaced, transverse rockshafts 212 and 214 are attached to the underside of frame section 24 for rotation about their respective longitudinal axes. Front rockshaft 212 has an upright crank arm 216 fixed thereto and connected at its upper end to the hydraulic actuator 62b. A short upright crank arm 218 is fixed to one end of rockshaft 212 and is connected via a coupling 220 to the beam 40 of gang assembly 36b. Preferably, coupling 220 has a pair of ball joints 222 and 224 at its opposite ends.

Rear rockshaft 214 has a short upright crank arm 226 that is fixed to rockshaft 214 intermediate its opposite ends. The upper end of crank arm 226 is connected to beam 40 rear gang assembly 38b by a coupling 228 having a pair of ball joints 230 and 232 at its opposite ends. A second crank arm 234 is fixed to rear rockshaft 214 in axially spaced relation to crank arm 226. The upper end of crank arm 234 is connected to a fore-and-aft link 236 that is coupled at its front end to crank arm 216 of front rockshaft 212. Thus, when hydraulic actuator 62b rotates rockshaft 212 via crank arm 216 to adjust the angular position of front gang assembly 36b, such motion is transmitted to rear gang assembly 38b by link 236, crank arm 234, rear rockshaft 214, and coupling 228.

The inventors hereby state their intent to rely on the Doctrine of Equivalents to determine and assess the reasonably fair scope of the present invention as it pertains to any apparatus not materially departing from but outside the literal scope of the invention as set forth in the following claims.

The invention claimed is:

1. A tillage implement comprising:
   a mobile frame;
   a first pair of elongated, non-overlapping, generally end-to-end gang assemblies supported by the frame,
   each of said gang assemblies including a plurality of rotatable tillage tools mounted in such a manner that their axes of rotation extend generally transverse to the path of travel of the frame,
   said gang assemblies being horizontally adjustable in mutually opposite directions relative to said frame about respective upright pivot axes for adjusting the angles between the path of travel of the frame and said axes of rotation of the tools;
   a pair of hydraulic actuators operably coupled with respective ones of said gang assemblies in a manner for effecting said angular adjustment of both gang assemblies simultaneously; and
   synchronizing apparatus operably interconnecting said gang assemblies for synchronizing the gang assemblies during said simultaneous angular adjustment by said pair of hydraulic actuators such that both gang assemblies are angularly adjusted by the same amount but in opposite directions,
   said synchronizing apparatus comprising a pair of intermeshing gear segments at opposed, proximal ends of the pair of gang assemblies.

2. A tillage implement as claimed in claim 1,
   each of said gear segments including a series of gear teeth arranged in an arc having a center of curvature at the pivot axis of the gang assembly.

3. A tillage implement as claimed in claim 1,
   further comprising a second pair of generally end-to-end gang assemblies supported on the frame in fore-and-aft spaced relation to said first pair of gang assemblies,
   each gang assembly of said second pair of gang assemblies including a plurality of axially spaced apart, rotatable tillage tools mounted in such a manner that their axes of rotation extend generally transverse to the path of travel of the frame,
   said gang assemblies of said second pair of gang assemblies being horizontally adjustable in mutually opposite directions relative to said frame about respective upright pivot axes for adjusting the angles between the path of travel of the frame and said axes of rotation of the tools of the second pair of gang assemblies; and
   linkage operably coupling each gang assembly of said first pair with a corresponding gang assembly of said second pair for causing adjustment of the gang assemblies of said second pair in response to angular adjustment of the gang assemblies of said first pair by said actuators.

4. A tillage implement as claimed in claim 3,
   said first pair of gang assemblies being adapted to carry out said adjusting movement in a direction opposite to the direction of said adjusting movement of the second pair of gang assemblies.

5. A tillage implement as claimed in claim 4,
   said pivot axis of each gang assembly of said first pair being laterally offset from the pivot axis of a corresponding gang assembly of said second pair,
   said linkage including a fore-and-aft link connected at one end to a gang assembly of said first pair on one side of the pivot axis of the gang assembly of said first pair and at an opposite end to a corresponding gang assembly of said second pair on an opposite side of the pivot axis of the gang assembly of said second pair.

6. A tillage implement as claimed in claim 4,
   said linkage including a first fore-and-aft link extending from a gang assembly of said first pair of gang assemblies toward said second pair of gang assemblies and a second fore-and-aft link extending from a corresponding gang assembly of said second pair of gang assemblies toward said first pair of gang assemblies,
   said links being connected at one end to their respective gang assemblies on the same side of said pivot axes and being operably connected at their other ends to opposite ends of a horizontally pivotal direction-reversing lever disposed between said first pair and said second pair.

7. A tillage implement as claimed in claim 3,
   said first pair of gang assemblies being disposed in front of said second pair of gang assemblies.

\* \* \* \* \*